United States Patent
De Toledo

[19]

[11] Patent Number: 6,163,471
[45] Date of Patent: Dec. 19, 2000

[54] DAMPING OF AN OSCILLATION IN A PLANT FOR TRANSMISSION OF HIGH VOLTAGE DIRECT CURRENT

[75] Inventor: Paolo Fischer De Toledo, Ludvika, Sweden

[73] Assignee: ABB AB, Vasteras, Sweden

[21] Appl. No.: 09/509,083

[22] PCT Filed: Sep. 14, 1998

[86] PCT No.: PCT/EP98/05825

§ 371 Date: Jun. 7, 2000

§ 102(e) Date: Jun. 7, 2000

[87] PCT Pub. No.: WO99/49549

PCT Pub. Date: Sep. 30, 1999

[30] Foreign Application Priority Data

Mar. 22, 1998 [EP] European Pat. Off. .............. 98200922

[51] Int. Cl.[7] .................................................. H02H 7/125
[52] U.S. Cl. .................................................................. 363/54
[58] Field of Search ................................. 363/35, 54, 50, 363/128, 129, 86, 87

[56] References Cited

U.S. PATENT DOCUMENTS

| 4,042,871 | 8/1977 | Grubbs et al. ............................. 363/54 |
| 4,797,833 | 1/1989 | El-Amawy et al. ....................... 363/54 |

FOREIGN PATENT DOCUMENTS

WO 94/07291  3/1994  WIPO .
WO 96/15573  5/1996  WIPO .

*Primary Examiner*—Shawn Riley
*Attorney, Agent, or Firm*—Pollock, Vande Sande & Amernick

[57] ABSTRACT

A plant for transmission of high voltage direct current is coupled to an alternating current network (3) with a fundamental frequency ($f$), and has a control equipment (CEQ) and a direct current link (5). A device (76) for damping an oscillation in a current (ID) in the direct current link at a frequency equal to the fundamental frequency has means (81) for generating reference signals (SSIN, SCOS) oscillating with an influenceable reference frequency ($f_R$), and means (821, 822,–831, 832, 84, 85, 86) for forming an actuating signal (SAS), oscillating with the reference frequency ($f_R$), and with a phase position equal to the sum of an adjustable phase angle displacement ($\sigma$) and of a phase position ($\phi$) of the oscillation in the current in the direct current link in relation to a voltage (UC) of the alternating current network. The device further has means (107) for forming a control signal ($\alpha$-FFC) in dependence on the actuating signal, which control signal is supplied to the control equipment. The device is supplied with a synchronising signal (SYNC) representing the fundamental frequency, and which influences the means for generating reference signals to vary the reference frequency in dependence on said synchronising signal so as to coincide with the fundamental frequency.

10 Claims, 2 Drawing Sheets

DAMPING OF AN OSCILLATION IN A PLANT FOR TRANSMISSION OF HIGH VOLTAGE DIRECT CURRENT

TECHNICAL FIELD

The present invention relates to a method for damping an oscillation in a current in the direct current link in a plant for transmission of high voltage direct current, which oscillation has a frequency equal to the fundamental frequency of an alternating current network to which the plant is coupled, and to a device for carrying out the method.

BACKGROUND ART

HVDC plants comprise converters which on their alternating current sides are coupled to alternating current networks via converter transformers, and on their direct current sides are coupled to each other via a direct current link. The alternating current networks each have a fundamental frequency, the nominal value of which is usually equal to 50 or 60 Hz.

During certain circumstances, oscillations of a frequency equal to the fundamental frequency can be initiated in the direct current transferred in the direct current link. In particular, the phenomena might occur when the plant exhibits on one hand a resonance on the alternating current side of the converter at a frequency equal to twice the fundamental frequency, and on the other hand a resonance on the direct current side at a frequency equal to the fundamental frequency, such as a combination of low impedance at the fundamental frequency as seen from the converter to the direct current link and a high impedance at twice the fundamental frequency as seen from the converter to the alternating current network. This phenomena might give rise to direct currents through the secondary windings of the converter transformer with an amplitude sufficient to bring the magnetic circuit of the transformer into saturation. The oscillations might build up comparatively slowly, during periods of the order of minutes and even hours.

The normal current control of the converter is not always able to sufficiently suppress this type of oscillation, which has as consequence that it will be sustained until the protective system of the plant is activated and trips the plant.

In the European Patent EP 0 671 067 a method and an arrangement for damping oscillations at or near a natural resonance frequency in a power transmission system are described. An oscillator is adapted to generate reference signals of the form sin $\omega_r t$ and cos $\omega_r t$ where $\omega_r$ is a pre-set frequency, selected with knowledge of a natural resonance frequency of the power transmission system, a frequency which can be equal to the fundamental frequency or to another frequency, for example a sub-synchronous frequency.

A measured value of a quantity sensed in the power transmission system, exemplified as the direct current in an HVDC transmission system, is multiplied with the reference signals. The products obtained are of the form X sin $\Phi$ and X cos $\Phi$, respectively, where X is the amplitude of the measured value, and $\Phi$ the phase position thereof in relation to a reference phase position. Each product is treated in a separate calculating circuit to the effect to add to the phase position $\Phi$ an adjustable phase angle displacement $\alpha$, is multiplied with the reference signals cos $\omega_r t$ and sin $\omega_r t$, respectively, and thereafter added. The sum is multiplied with an amplification constant K. The result is a control signal of the form K cos $(\omega_r t + \alpha + \Phi)$, which control signal is supplied to the power transmission system, in the case this is an HVDC plant, for example in such a way that the ordered control angle is generated in direct dependence on the control signal. The control system operates as a sampled system and the phase angle displacement $\alpha$ is chosen for best damping with respect to delays in the sampling.

The products X sin $\Phi$ and X cos $\Phi$ are supplied to a diagnostic and determination circuit, wherein each of them is compared to a predetermined limiting value. If anyone of the limit values is exceeded, the control signal is supplied to the power transmission system in dependence on a decision circuit comprising delay circuits with pre-selected time delays. The criteria for the supply of the control signal to the power transmission system is that a limiting value is exceeded during a certain period of time, for example 15 ms.

The generation of the products X sin $\Phi$ and X cos $\Phi$, respectively, can be interpreted as a projection of the measured value on two orthogonal axes in a co-ordinate system which rotates with an angular velocity corresponding to the pre-set frequency $\omega_r$ of the oscillator, and the measured value is thus represented by a vector in this co-ordinate system. For the case that the frequency of the oscillation of the measured value coincides with the frequency of the oscillator, this vector is stationary in the co-ordinate system, that is, its projections on the axes are constant in time. For the case that the frequency of the oscillation of the measured value is different from the frequency of the oscillator, the vector rotates in the co-ordinate system with an angular velocity corresponding to the difference between the frequency of the oscillator and that of the measured value. In this case, the projections of the measured value will fluctuate in time. If the limiting values are symmetrical with respect to positive and negative deviations, the lines connecting the in the co-ordinate system plotted limiting values will form a rectangle with its centre at the origin.

As is understood from the above, the mentioned delay of the supply of the control signal, when a limiting value is exceeded, implies that with the in the patent proposed method also an oscillation of a frequency which differs from the frequency of the oscillator will be detected.

Thus, this method allows for detection of oscillations with frequencies within a certain range around the pre-set frequency of the oscillator, that is, the detection system has a certain band width, whereas the counteracting damping action initiated via the control signal is of the pre-set frequency.

The fundamental frequency of an alternating current network is, however, in general not constant but varies in dependence on various operating parameters. In strong networks with good control of the frequency, the frequency deviations are typically ±0.1 Hz, in extreme cases they can amount to the order of ±5 Hz. For the oscillation phenomena described in the introductory part of the description, the frequency of the oscillation is equal to the actual value of the fundamental frequency, whereas an oscillator as proposed in the patent should then be pre-set to oscillate with the nominal value of the fundamental frequency.

With a counteracting action at the nominal value of the fundamental frequency, there will be a risk that, with the gain required to counteract an oscillation of the kind described in the introductory part of the description, such a control signal would interfere with and influence also other phenomena and processes in the plant, for example in such a way that the mentioned saturation of the converter transformers would be circulating between the phases of the transformer with a certain beat frequency.

SUMMARY OF THE INVENTION

The object of the invention is to provide an improved method of the kind mentioned in the introductory part of the description, which method has narrow band width detection properties for the detection of oscillations of the actual value of the fundamental frequency, and generates a control signal of that frequency for counteracting and damping the oscillations, as well as a device for carrying out the method.

According to the invention, this is accomplished by generating the reference signals used for the determination of the phase position of the oscillation and for the generation of the control signal in such a way that their frequency follows the actual value of the fundamental frequency, which actual value is continuously monitored.

By those means, an oscillation in the direct current of a frequency equal to the actual value of the fundamental frequency will be accurately and efficiently detected, and the counteraction initiated in dependence on the control signal will influence the power transmission system at this same frequency value.

Advantageous improvements of the invention will become clear from the following description and claims.

BRIEF DESCRIPTION OF THE DRAWINGS

The invention will be explained in greater detail by description of embodiments with reference to the accompanying drawings, which are all schematic and in the form of single-line diagrams and block diagrams, respectively, and wherein.

DESCRIPTION OF THE PREFERRED EMBODIMENTS.

The following description relates both to the method and to the device, and the block diagrams can thus be regarded both as signal flow diagrams and block diagrams of a device. The functions to be performed by the blocks shown in the block diagrams may in applicable parts be implemented by means of analogue and/or digital technique in hard-wired circuits, or as programs in a microprocessor. Thus, as the case may be, the expression "signal" can also be interpreted as a value generated by a computer program and appearing only as such. Only functional descriptions of the blocks are given below as these functions can be implemented in manners known per se by persons skilled in the art.

Figure 1:
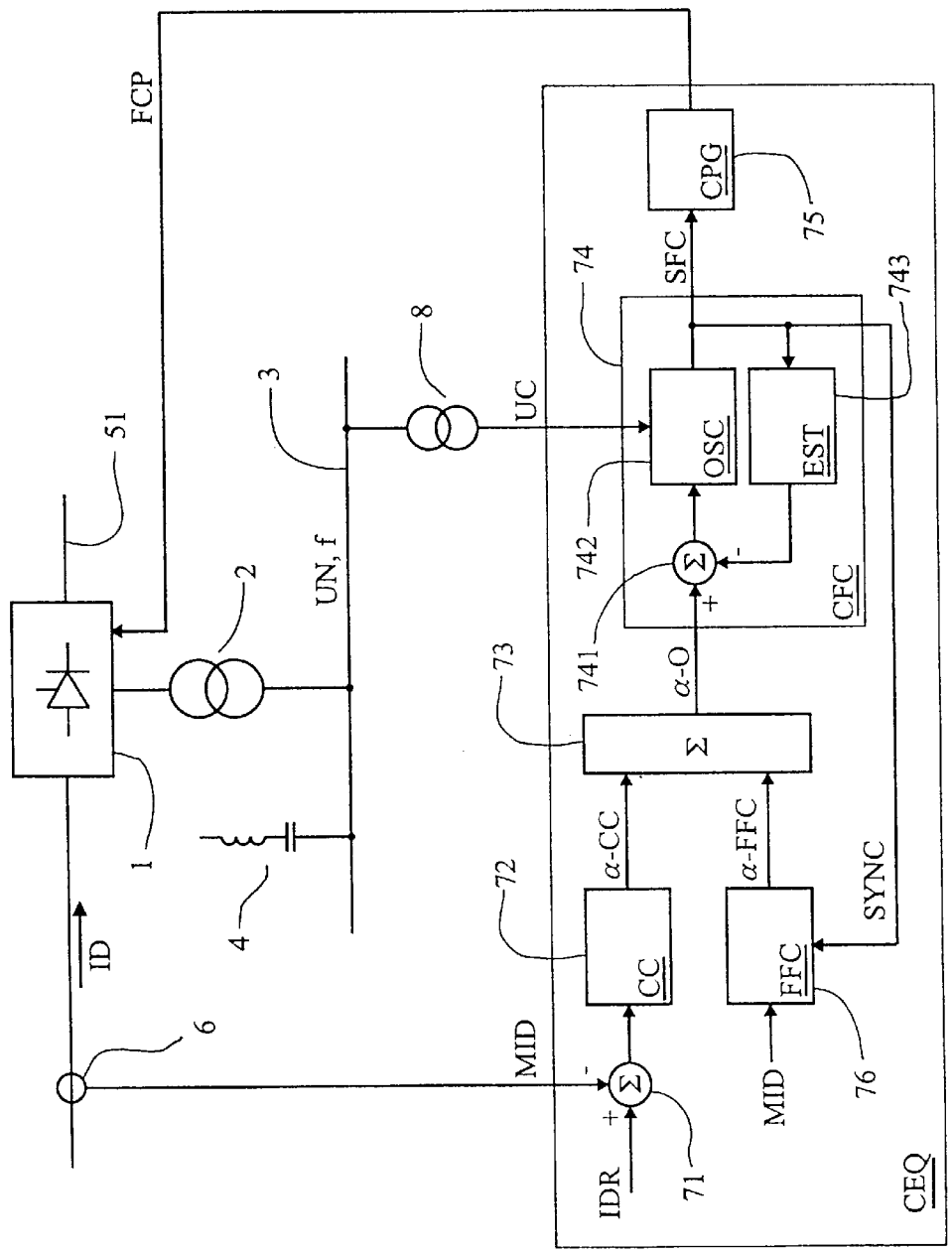
FIG. 1 shows parts of an HVDC plant with a converter and parts of its control equipment, with a fundamental frequency control unit according to the invention.

FIG. 1 shows a thyristor converter 1 for conversion between alternating current and direct current in an HVDC plant. The alternating current side of the converter is via a converter transformer 2 coupled to an alternating current network 3 with a fundamental frequency $f$, usually nominally equal to 50 or 60 Hz. A harmonic filter equipment 4 for shunting of harmonics generated by the converter and for generation of reactive power is coupled to the alternating current network. The direct current side of the converter is coupled to a direct current link 5, of which only one conductor 51 is shown in the figure. A measuring device 6 senses a current ID flowing through the conductor 51, and supplies a measured current value MID thereof to a control equipment CEQ for the converter. For the purpose of the description of the invention, it is assumed that the converter operates in current control mode, and only parts of the control equipment relevant for this control mode are shown in the figure. The difference between a current reference value IDR and the measured current value MID, is formed in a difference forming member 7 and supplied to a current controller 71. The output α-CC of the current controller is, via a sum forming member 73 supplied to a difference forming member 741 of a converter firing control unit 74 as an order value α-O for the control angle α of the converter. The output SFC of the converter firing control unit is supplied to a control pulse generator 75, which in dependence thereon outputs and supplies firing control pulses FCP to the valves of the converter.

This part of the control equipment, with the exception of the sum forming member 73, is described in more detail in Ake Ekstrom: High Power Electronics HVDC and SVC, Stockholm June 1990, in particular pages 7–1 to 7–13. The converter firing control unit comprises an oscillator circuit 742, the frequency of which is controlled by a voltage UC, supplied from the alternating current network via a transformer 8. The oscillator circuit is at steady state operation phase-locked to the network and oscillating with a frequency equal to $p * f$, where p is the pulse number of the converter, usually 12, and $f$ is the fundamental frequency of the alternating current network. The actual average value of the firing angles for all the valves is estimated in an estimation circuit 743, supplied with the output SFC of the converter firing control unit, and the difference between the order value α-O for the control angle and this average value, formed in the difference forming member 741, is supplied to the oscillating circuit. As is realised from the above description, a synchronising signal SYNC, which at steady state operation is in synchronism with the actual value of the fundamental frequency $f$ of the alternating current network and phase-locked thereto, and thus representing that actual value of the fundamental frequency, can be tapped from the output of the oscillating circuit, for example in the form of a short pulse at the start of each period of the voltage of the network.

Figure 2:
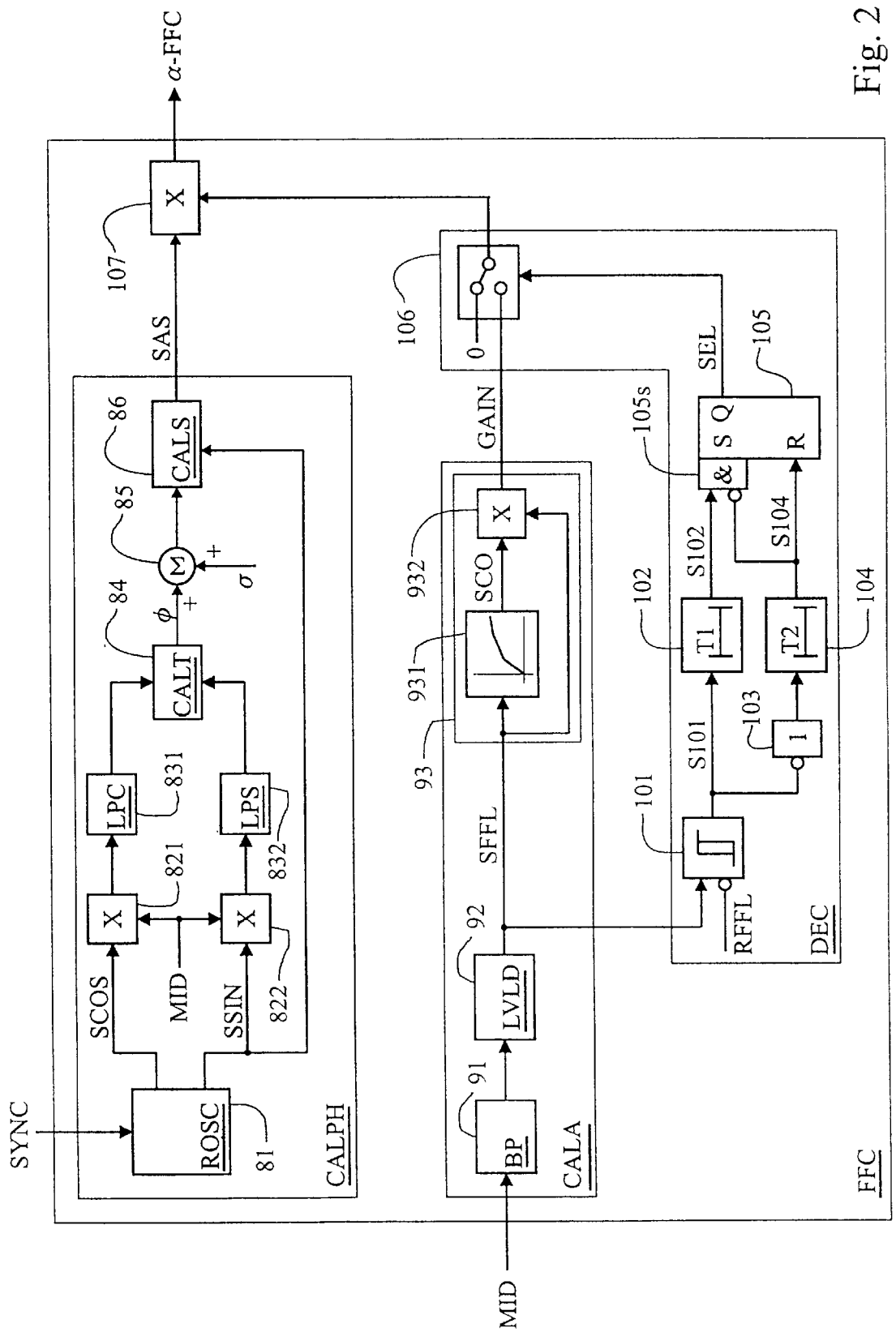
FIG. 2 shows an embodiment of a fundamental frequency control unit according to FIG. 1.

According to the invention, the control equipment CEQ comprises a fundamental frequency control unit 76, supplied with the measured current value MID and the synchronising signal SYNC and generating a control signal α-FFC. The control signal is supplied to the sum forming member 73 in the control equipment CEQ, so that the order value α-O for the control angle α of the converter is formed, in dependence on the control signal, as the sum of the output α-CC of the current controller 71 and the control signal α-FFC generated by the fundamental frequency control unit 76. A block diagram of an embodiment of such a unit is illustrated in FIG. 2.

The unit comprises a first calculation unit CALPH, a second calculating unit CALA, a decision circuit DEC, and a multiplying member 107. The first calculation unit CALPH determines the phase position Φ of a fundamental frequency oscillation in the measured current value with the voltage of the alternating current network as a chosen reference, and generates a sinus-formed actuating signal SAS having a frequency determined by the synchronising signal and with a phase position equal to the sum of the phase position Φ and an adjustable phase angle displacement Φ. The second calculating unit CALA determines the amplitude of a fundamental frequency oscillation in the measured current value and generates an amplification signal GAIN in dependence thereon. The decision circuit DEC determines, in dependence on a selected criteria, when to supply the control signal to the sum forming member 73, and the multiplying member 107 forms the control signal as the product of the actuating signal and the amplification signal, when the criteria is fulfilled.

The first calculation unit comprises a reference signal oscillator 81 which is supplied with the synchronising signal SYNC, and in dependence thereon generates a first reference signal SCOS of the form SCOS=cos $2\pi f_R$ t and a second reference signal SSIN of the form SSIN=sin $2\pi f_R$ t, where $f_R$ is equal to the actual value of the fundamental frequency $f$ of the alternating current network, as sensed at the oscillator 742 of the converter firing control unit, and t is time. The first reference signal is supplied to a multiplying member 821, which is also supplied with the measured current value MID of the direct current. The output of the multiplying member 821 is supplied to a filter member 831 with low pass characteristics. The second reference signal is supplied to a multiplying member 822, which is also supplied with the measured current value MID. The output of the multiplying member 822 is supplied to a filter member 832 with similar characteristics as the filter member 831.

In the same manner as mentioned above, the outputs of the filter members 831, 832 can be interpreted as the projection of the measured current value on two orthogonal axes in a co-ordinate system which rotates with an angular velocity corresponding to the actual value of the frequency $f$ of the alternating current network.

An oscillation in the measured current value of a frequency equal to the actual value of the frequency of the alternating current network is thus represented by a stationary vector in this co-ordinate system. The outputs of the filter members are supplied to a calculating member 84, which by division of the applied signals and using the arcus tangent-function on the result, calculates the phase position $\Phi$ of the vector. The output of the calculating member 84 is supplied to a sum forming member 85, also supplied with the adjustable phase angle displacement $\sigma$. The output of the sum forming member 85 and the second reference signal SSIN are supplied to a calculating member 86, which in dependence thereon forms the actuating signal SAS, having the form SAS=$\sin(2\pi f_R t+\Phi+\sigma)$.

The filter members 831 and 832 can preferably be designed as low-pass filters of the 4th order with a cut-off frequency chosen so as to obtain in combination a quick response as well as high accuracy, typically at about the nominal value of the fundamental frequency.

In a preferred embodiment of the invention, where functions of the converter firing control unit are implemented as a computer program running on a micro-processor, an existing signal which changes its status after each firing of a valve and thereby initiates a delay time to the sub-sequent firing, is used as the synchronising signal. During steady state operation, this signal represents the fundamental frequency as it is effectively in synchronism with the fundamental frequency of the alternating current network and phase-locked thereto. Studies have shown that although this may not be the case during transients due to for example faults in the plant, the fundamental frequency control unit will still provide efficient damping also under such conditions.

The second calculating unit CALA comprises a band pass filter member 91, designed with a narrow pass band around the nominal value of the fundamental frequency. The band width is selected with knowledge of expected frequency deviations in the network, in a 50 Hz system for example as a 2nd order filter with a centre frequency of 50 Hz and cut-off frequencies at 48.5 Hz and 51.5 Hz respectively. The output of the band pass filter member is supplied to a calculating member 92, which by rectification of the supplied signal and level detection thereof, outputs an amplitude signal SFFL, representing the amplitude of an oscillation in the measured current value within the frequency range of the band pass filter member. The amplitude signal is supplied to a calculating member 93, which, in dependence on the input signal calculates and outputs an amplification signal GAIN for multiplication with the actuating signal SAS. Studies have shown that the amplification signal preferably can depend on the amplitude of the oscillation in such a way that the amplification signal increases with increasing amplitude. In a preferred embodiment, the calculating member 93 comprises a function-forming member 931, which in dependence on the amplitude signal supplied to it, outputs a correction signal SCO according to a pre-selected function, for example a function with a graph that comprises a number of linear elements, the inclination of which decrease with increasing inputted amplitude signal. The calculating member 93 further comprises a multiplying member 932, supplied with the amplitude signal and with the correction signal and forming the amplification signal as the product thereof.

In a preferred embodiment, the decision circuit DEC comprises a level comparator 101, a negating circuit 103, two time delay circuits 102 and 104 with time delays T1 and T2, respectively, a bi-stable circuit 105, and a selector switch 106. The amplitude signal SFFL and a pre-selected level reference signal RFFL are supplied to the level comparator, which outputs a logical signal S101 is when the amplitude signal exceeds the level reference signal. The signal S101 is supplied to the time delay circuit 102 and to the negating circuit 103. The output of the negating circuit is supplied to the time delay circuit 104. The SET-input of the bi-stable circuit comprises an AND-circuit 105s supplied with the output signals S102 and S104 of the time delay circuits 102 and 104, respectively, the output signal S104 to a negating input of the AND-circuit 105s. The output signal S104 is also supplied to the RESET-input of the bi-stable circuit. The Q-output of the bi-stable circuit generates a selector signal SEL, which is supplied to the selector switch. In the absence of the selector signal, the selector switch connects to the multiplying member 107 a ZERO-signal, and in the presence of the selector signal the amplification signal GAIN. Thus, the control signal is, in dependence on the selector signal, selectively equal to zero or equal to the product of the actuating signal and the amplification signal. In the absence of a fundamental frequency oscillation in the measured current value, the output signal S101 of the level comparator is a logical "0" and the signal S104 a logical "1". The bi-stable circuit is thus reset, there is no selector signal and the control signal is zero. At the occurrence of a fundamental frequency oscillation, the amplitude of which exceeds the level reference signal, the output signal S101 becomes a logical "1", and the signal S104 becomes immediately a logical "0". The signal S101 is supplied to the AND-circuit 105s with a time delay T1, The bi-stable circuit is then set, outputting the selector signal, which in turn changes the control signal to be equal to the product of the actuating signal and the amplification signal. When the amplitude signal decreases below the level of the reference signal, the signal S102 becomes a logical "0" immediately, and the signal S104 becomes, with a time delay T2, a logical "1", which resets the bi-stable circuit, thereby bringing the control signal back to zero. To avoid a unnecessary frequent switching of the selector switch, the time delay T1 can in a 50 Hz system typically be selected to 100 ms, and the time delay T2 to 50 ms.

The level reference signal can typically correspond to an oscillation of an amplitude of 1% of the rated direct current. The level comparator can preferably have a hysteresis as indicated in the symbol in FIG. 2.

The adjustable phase angle displacement σ is adjusted to obtain a good damping of the fundamental frequency oscillations and its value is determined preferably by simulation studies of the HVDC plant and/or verifications in the actual plant at the commissioning stage.

Studies have shown that the method according to the invention also gives efficient damping after a system disturbance, such as for example during recovery of the operation after a transitory fault, when the converter transformers can be brought into saturation very quickly.

The invention is not limited to the embodiment described, but a number of modifications within the reach of the person skilled in the art are feasible within the scope of the claims. Thus, for example, the synchronisation of the reference oscillator to the sensed actual value of the fundamental frequency can be arranged in other ways by sensing the voltage of the alternating current network at suitable locations or making use of other signals, corresponding to that actual value, and the decision circuit can be implemented according to other criteria.

What is claimed is:

1. A method, for use in a plant for transmission of high voltage direct current, which plant is coupled to an alternating current network with a fundamental frequency, and which plant has a control equipment and a direct current link, the method being for damping an oscillation in a current in the direct current link at a frequency equal to the fundamental frequency, and having the steps of:
   generating reference signals oscillating with an influencable reference frequency:
   multiplying the reference signals by a measured current value of the current in the direct current link;
   forming an actuating signal, which oscillates with the influenceable reference frequency and has a phase position equal to the sum of an adjustable phase angle displacement and a phase position of the oscillation in the current, in relation to a voltage of the alternating current network; and
   forming a control signal in dependence on the actuating signal, and supplying the control signal to the control equipment, and wherein the step of generating reference signals comprises the steps of:
   forming a synchronizing signal representing the fundamental frequency, and;
   influencing the reference frequency to vary in dependence on said synchronizing signal so that the reference frequency coincides with the fundamental frequency.

2. A method according to claim 1, wherein the step of forming the control signal comprises the steps of:
   forming an amplitude signal representing the amplitude of the oscillation;
   forming an amplification signal in dependence on said amplitude signal; and
   forming a product of said amplification signal and the actuating signal, and forming the control signal in dependence on said product.

3. A method according to claim 2, wherein said amplification signal is formed in dependence on said amplitude signal so that it increases with increasing amplitude of the oscillation.

4. A method according to claim 2, wherein the step of supplying the control signal to the control equipment comprises the steps of:
   comparing said amplitude signal with a pre-selected level reference signal; and
   supplying the control signal to the control equipment in dependence on said comparison.

5. A method according to claim 1, wherein an order value for the control angle for a converter in the plant is generated in dependence on an output signal of a controller comprised in the control equipment, and wherein the step of supplying the control signal to the control equipment comprises the step of forming the order value for the control angle in dependence on a sum of the output signal and the control signal.

6. A device for use in a plant for transmission of high voltage direct current, which plant is coupled to an alternating current network with a fundamental frequency, and which has a control equipment and a direct current link, the device being for damping an oscillation in a current in the direct current link at a frequency equal to the fundamental frequency, the device including:
   means for generating reference signals oscillating with an influenceable reference frequency;
   means for multiplying the reference signals with a measured current value of the current in the direct current link;
   means for forming an actuating signal, which oscillates with the reference frequency and has a phase position equal to the sum of an adjustable phase angle displacement and a phase position of the oscillation in the current, in relation to a voltage of the alternating current network; and
   means for forming a control signal in dependence on the actuating signal, which control signal is supplied to the control equipment, and wherein the device is supplied with a synchronizing signal representing the fundamental frequency, which synchronizing signal influences the means for generating reference signals to vary the reference frequency in dependence on said synchronizing signal so that the reference frequency coincides with the fundamental frequency.

7. A device according to claim 6, further comprising:
   means for forming an amplitude signal representing the amplitude of the oscillation;
   means for forming an amplification signal in dependence on said amplitude signal; and
   means for forming a product of said amplification signal and the actuating signal, and wherein the control signal is formed in dependence on said product.

8. A device according to claim 7, wherein said means for forming an amplification signal comprises means for forming said amplification signal in dependence on said amplitude signal so that said amplification signal increases with increasing amplitude of the oscillation.

9. A device according to claim 7, further comprising:
   means for comparing said amplitude signal with a pre-selected level reference signal;
   means for forming a selector signal in dependence on the result of the comparison; and
   means for supplying the control signal to the control equipment in dependence on said selector signal.

10. A control equipment for a plant for transmission of high voltage direct current having a controller, wherein an order value for the control angle for a converter in the plant is generated in dependence on an output signal of the controller, and wherein the control equipment is supplied with a control signal formed by a device according to claim 6, and wherein the control equipment comprises means for forming the order value for the control angle in dependence on a sum of the output signal and the control signal.

* * * * *